United States Patent [19]
Meyer et al.

[11] Patent Number: 5,579,216
[45] Date of Patent: Nov. 26, 1996

[54] CIRCUIT ARRANGEMENT FOR AN INDUCTIVE LOAD

[75] Inventors: Helmut Meyer, Weinheim; Johann Schunn, Leimen, both of Germany

[73] Assignee: Heidelberger Druckmaschinen AG, Heidelberg, Germany

[21] Appl. No.: 603,387

[22] Filed: Feb. 20, 1996

Related U.S. Application Data

[63] Continuation of Ser. No. 247,295, May 23, 1994, abandoned.

[30] Foreign Application Priority Data

May 21, 1993 [DE] Germany ............... 43 17 044.7

[51] Int. Cl.$^6$ .............. H02M 5/42; H02K 23/00
[52] U.S. Cl. ................. 363/84; 318/254
[58] Field of Search ................ 363/39, 44, 45, 363/46, 81, 84, 90; 318/138, 254

[56] References Cited

U.S. PATENT DOCUMENTS

| | | | |
|---|---|---|---|
| 4,700,116 | 10/1987 | Inoue et al. | 318/254 |
| 4,743,815 | 5/1988 | Gee et al. | 318/254 |
| 4,752,724 | 6/1988 | Radziwill et al. | 318/254 |
| 4,782,272 | 11/1988 | Buckley et al. | 318/254 |
| 5,296,787 | 3/1994 | Albrecht et al. | 318/433 |
| 5,499,178 | 3/1996 | Mohan | 363/39 |
| 5,513,092 | 4/1996 | Goebel | 363/84 |

FOREIGN PATENT DOCUMENTS

| | | |
|---|---|---|
| 0102614 | 3/1984 | European Pat. Off. . |
| 0541253 | 5/1993 | European Pat. Off. . |
| 3237779 | 4/1983 | Germany . |
| 3017885 | 8/1985 | Germany . |
| 4120100 | 1/1992 | Germany . |
| 4026366 | 6/1992 | Germany . |
| 662019 | 8/1987 | Switzerland . |

OTHER PUBLICATIONS

Patent Abstract of Japan No. JP 59–014,366 (Toshiaki et al), May 2, 1984.
Aus der Forschung Publ. ETZ–A No. 94(1973) pp. 610–613 (Blumenthal), "Modifiziertes Stromregelverfahren"..
IEEE Transactions on Industrial Electronics Publ. vol. 35, No. 4 Nov. 1988 (Tian–Hua Liu et al.).
German Search Report.

Primary Examiner—Matthew V. Nguyen
Attorney, Agent, or Firm—Herbert L. Lerner; Laurence A. Greenberg

[57] ABSTRACT

Circuit arrangement for an inductive load with a rotor and at least one winding, a DC-voltage intermediate circuit and at least one switchable semiconductor rectifier of a power stage connected to the winding for passing a current therethrough, and a current regulator subject to hysteresis for regulating the current, includes control electronics connected to the current regulator for prescribing the hysteresis and the frequency of the current regulator, respectively, as a function of the current.

9 Claims, 2 Drawing Sheets

$\Delta I = \text{const}$ $\Delta I = f(t)$

CIRCUIT ARRANGEMENT FOR AN INDUCTIVE LOAD

This application is a continuation of application Ser. No. 08/247,295, filed May 23, 1994, now abandoned.

The invention relates to a circuit arrangement for an inductive load, more particularly, with at least one winding conducting a current via a DC-voltage intermediate circuit and at least one switchable semiconductor rectifier of a power stage, the current being regulated via a current regulator subject to hysteresis.

The hysteresis of a two-point regulator is usually determined so that the current fluctuations associated therewith lie percentagewise in the order of magnitude of 10 to 20% of the rated current. This is problematic for drives which operate over a wide speed range. Thus, low currents, such as a current which is 5%, for example, of the rated current, are unable to be set without a discontinuity being registered by the current regulator in this range, i.e., the current regulator thus does not operate satisfactorily in the range of low currents.

It is accordingly an object of the invention to provide a circuit arrangement for an inductive load which permits a reliable method of operation of the current regulator also in the range of low currents.

With the foregoing and other objects in view, there is provided, in accordance with the Invention, a circuit arrangement for an inductive load with a rotor and at least one winding, a DC-voltage intermediate circuit and at least one switchable semiconductor rectifier of a power stage connected to the winding for passing a current therethrough, and a current regulator subject to hysteresis for regulating the current, comprising control electronics connected to the current regulator for prescribing the hysteresis and the frequency of the current regulator, respectively, as a function of the current.

In accordance with another feature of the invention, the control electronics has means for determining the hysteresis and the frequency of the current regulator, respectively, so that a mean value of the current depends functionally upon the current.

In accordance with a further feature of the invention, the hysteresis and the frequency of the current regulator, respectively, have a functional dependence upon at least one of a nominal current value and an actual current value.

In accordance with an added feature of the invention, the hysteresis and the frequency of the current regulator, respectively, are proportional to the current, i.e., the hysteresis, the frequency and the current have a linear dependency. In another embodiment of the circuit arrangement according to the invention, the mean value of the current is proportional to the nominal value of the current and to the actual value of the current, respectively.

Especially due to the foregoing constructions, the circuit arrangement according to the invention operates so that, a low hysteresis and a high switching frequency, respectively, occur at low currents, whereas a relatively high hysteresis with a correspondingly low switching frequency is to be expected when the currents are high. In this way, exact current values may be set also in the range of low currents.

In accordance with an additional feature of the invention, the motor has a final power stage connected thereto, the final power stage including switchable semiconductor rectifiers, and wherein the prescribed hysteresis and frequency of the current regulator, respectively, are such that switching losses of the switchable semiconductor rectifiers are at most equal to, i.e., do not exceed, a maximum permissible thermal limit.

Although the switching losses amongst others are proportional to the frequency, they barely have any effect in the range of low currents, because the currents to be switched are very low therein so that, in spite of increasing frequency, the thermal loading or stress is of little consequence. Through the last-mentioned construction of the circuit arrangement according to the invention, assurance is provided, especially at high speeds, that the switching losses do not lead to any excessive temperature increase in the semiconductor rectifiers.

In accordance with yet another feature of the invention, the current regulator is a two-point regulator, preferably with a variable hysteresis.

In accordance with yet a further feature of the invention, the current regulator is a PI regulator, preferably with a variable frequency.

In accordance with a concomitant feature of the invention, the inductive load is a brushless direct-current motor.

Other features which are considered as characteristic for the invention are set forth in the appended claims.

Although the invention is illustrated and described herein as embodied in a circuit arrangement for an inductive load, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
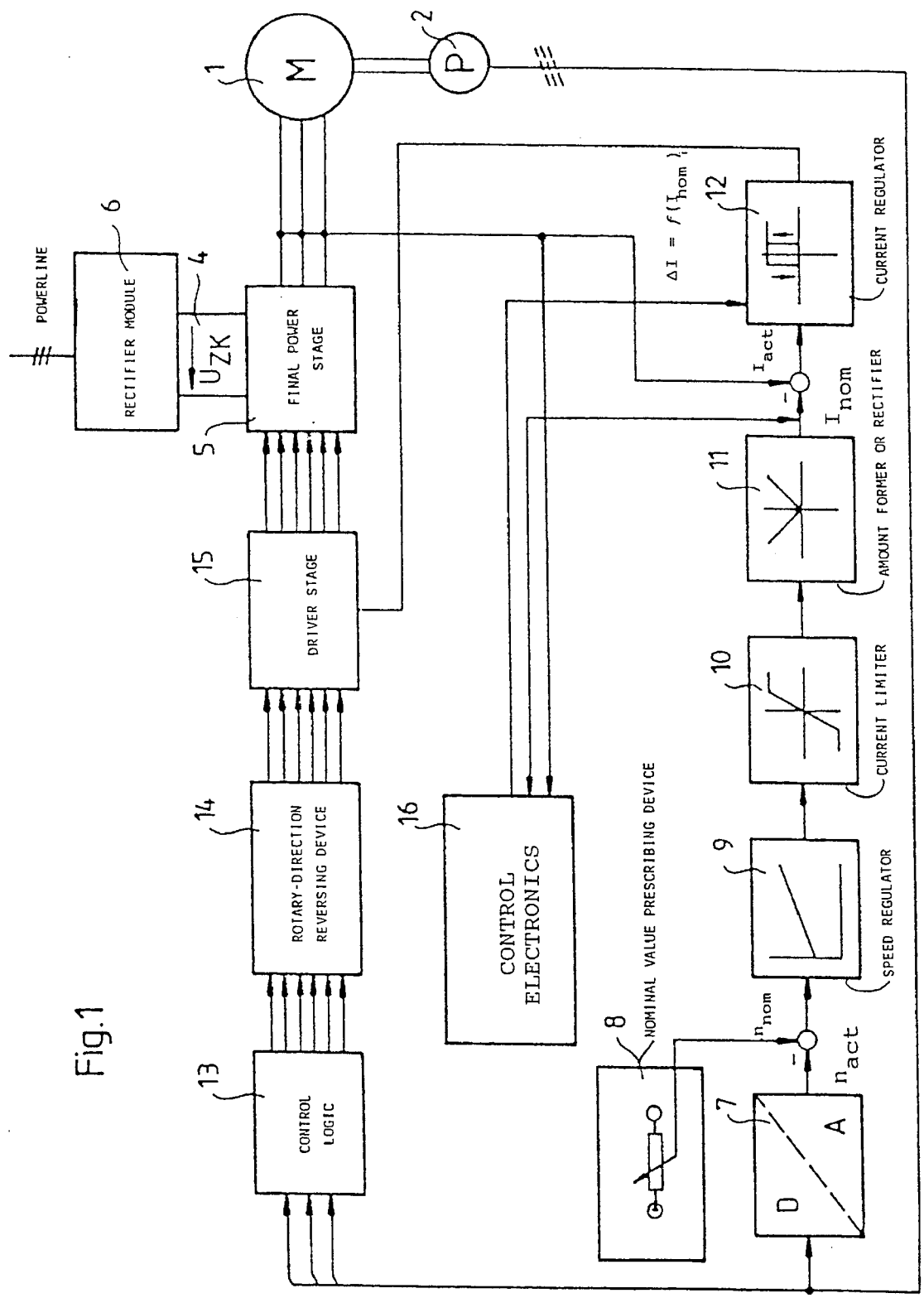
FIG. 1 is a block diagram of the circuit arrangement for an inductive load according to the invention.

Referring now to the drawings and, first, particularly to FIG. 1 thereof, there is shown therein a block diagram of an embodiment of the circuit arrangement for an inductive load according to the invention. The illustrated embodiment relates to a brushless direct-current motor 1 with a permanently magnetic rotor and three phase windings. A rotor-position transmitter 2, which furnishes commutation signals for the phase windings of the direct-current motor 1, is operatively associated in a conventional manner with the direct-current motor 1. Control of the phase windings of the motor 1 is effected in accordance with the commutation signals of the rotor-position transmitter 2 via a DC-voltage intermediate circuit-rectifier formed of a rectifier module 6 on the powerline side and of a final power stage 5 on the press side. The final power stage 5 in the case at hand is a three-phase bridge with six power transistors and freewheeling diodes connected antiparallel therewith. A DC-voltage intermediate circuit 4 with an impressed DC-voltage $U_{ZK}$ lies between the rectifier module 6 and the final power stage 5. The continuous switching of the power transistors of the final power stage 5 is effected via a control logic 13 and a rotary-direction reversing device 14 with a post-connected driver stage 15.

Digital signals of the rotor position transmitter 2 are used for determining the actual rotary-speed value. For this purpose, these signals are converted by actual rotary-speed preparation equipment, i.e., a digital-to-analog (D/A) transducer 7, into an analog voltage. Because no external tachometer is necessary for determining the actual rotary-speed value in the case of the aforementioned actual rotary-speed preparation equipment 7, the provision of such equipment in accordance with the invention is especially economical. The nominal rotary-speed $n_{nom}$ is made available by a conventional nominal-value prescribing device 8. Rotary-speed control or regulation is effected in a conventional manner by means of a rotary-speed regulator 9, such as a PI (proportional-integral) regulator, for example, a current limiter 10 and an amount former or rectifier 11. At the output of the amount former or rectifier 11, the nominal current value $I_{nom}$ for the current regulation underlying the rotary-speed regulation is applied. The actual-current value $I_{act}$ of the motor current is measured in the individual phase windings of the brushless direct-current motor 1. The instant a deviation between the nominal-current value $I_{nom}$ and the actual-current value $I_{act}$ occurs, it is compensated for by a current regulator 12. The current regulator 12 used in the embodiment of the invention illustrated in FIG. 1 is of the type known as a two-point, i.e. two-pole regulator subject to a hysteresis $\Delta I$, namely which switches the current I off when it reaches an upper limit value, and switches it on when it reaches a lower limit value. The hysteresis $\Delta I$ of the current regulator 12 is not constant, but is rather functionally dependent upon the current value of the direct-current motor 1. The current value referred to hereinbefore is either the nominal-current value $I_{nom}$ which is applied at the output of the amount former 11, or the actual-current value $I_{act}$ which is measured in the phase windings of the brushless direct-current motor 1. The functional dependence f(I) of the hysteresis $\Delta I$ upon the current value I is provided by control electronics 16. The functional dependence, for example, the proportionality, between the hysteresis $\Delta I$ and the current I is stored in the control electronics 16 in the form of characteristic curves. It is also conceivable that the control electronics 16 may compute the desired hysteresis value $\Delta I$ from the current I.

Figure 2A:
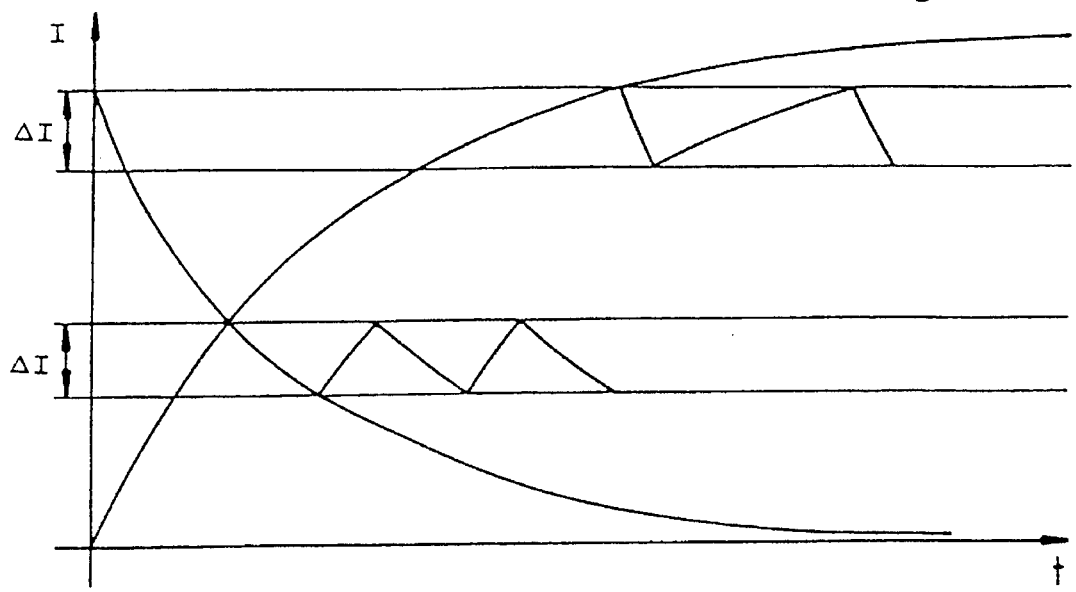
FIG. 2a is a plot diagram illustrating the time rate of change of the current for a constant hysteresis.

In FIG. 2a, the time rate of change of the current I at constant hysteresis $\Delta I$ is shown in a plot diagram. The current regulation with constant hysteresis $\Delta I$ is performed reliably as long as the set current does not lie in the order of magnitude of the set hysteresis $\Delta I$. The instant the current I appears within the range of the hysteresis $\Delta I$, exact current regulation is no longer possible because the current exhibits discontinuities or irregularities.

Figure 2B:
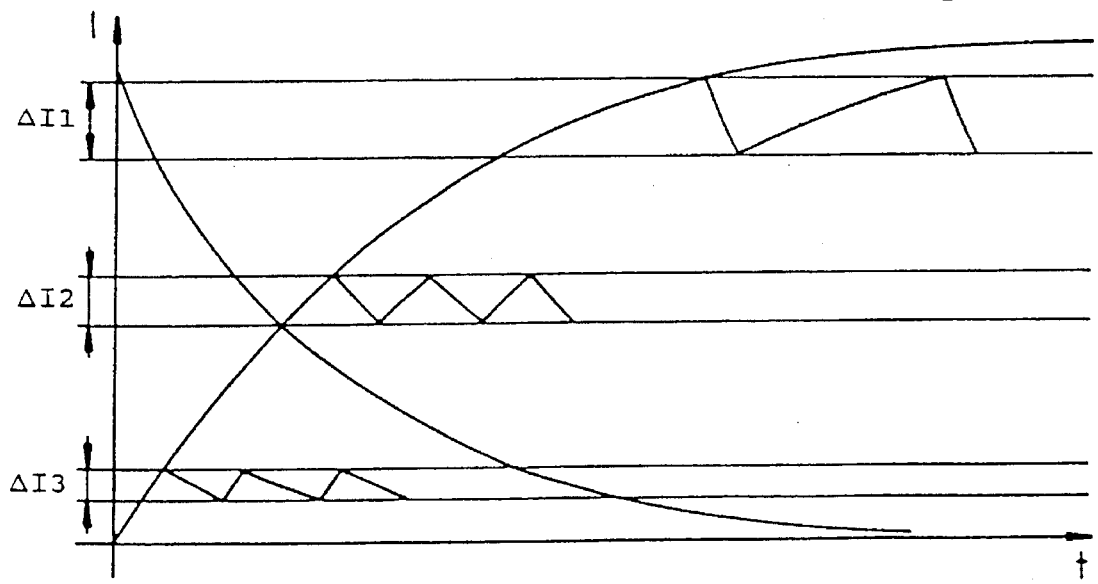
FIG. 2b is a plot diagram illustrating the time rate of change of the current for a variable hysteresis according to the circuit arrangement according to the invention.

FIG. 2b is a plot diagram wherein the time rate of change of the current I is represented for a variable hysteresis $\Delta I$ in accordance with the invention of the instant application. In the illustrated example, there is a linear dependence between the hysteresis $\Delta I$ and the current I. In the high current range, the hysteresis $\Delta I$ is selected to be in the usual order of magnitude wherein care must be taken only that the permissible limit for the temperature increase of the semiconductor rectifiers connected with the switching losses is not exceeded. In the range of low currents, due to the proportionality between the hysteresis $\Delta I$ and the current I, it is also possible that current regulation will remain reliable even in the low rotary-speed range, because the hysteresis $\Delta I$ in this case always also forms a fraction of the current I.

We claim:

1. Circuit arrangement for an inductive load with a rotor and at least one winding, a DC-voltage intermediate circuit and at least one switchable semiconductor rectifier of a power stage connected to the winding for passing current of a given current value through the winding at a given current frequency, and a current regulator operative for applying hysteresis to the current, comprising control electronics connected to the current regulator for regulating the hysteresis of the current regulator, respectively, as a function of at least one of the current value through the winding and the current frequency.

2. Circuit arrangement according to claim 1, wherein the control electronics has means for regulating the hysteresis and the current frequency of the current regulator, respectively, so that a mean value of the current depends functionally upon the current value.

3. Circuit arrangement according to claim 1, wherein the hysteresis and the frequency of the current regulator, respectively, have a functional dependence upon at least one of a nominal current value and an actual current value.

4. Circuit arrangement according to claim 1, wherein the hysteresis and the frequency of the current regulator, respectively, are proportional to the current.

5. Circuit arrangement according to claim 1, wherein the motor has a final power stage connected thereto, the final power stage including switchable semiconductor rectifiers, and wherein the prescribed hysteresis and frequency of the current regulator, respectively, are such that switching losses of the switchable semiconductor rectifiers are at most equal to a maximum permissible thermal limit.

6. Circuit arrangement according to claim 1, wherein the current regulator is a two-pole regulator.

7. Circuit arrangement according to claim 1, wherein the current regulator is a proportional-integral regulator.

8. Circuit arrangement according to claim 1, wherein the inductive load is a brushless direct-current motor.

9. Circuit arrangement for an inductive load with a rotor and at last one winding, a DC-voltage intermediate circuit and at least one switchable semiconductor rectifier of a power stage connected to the winding for passing a current of a given frequency and a given current value through the winding, and a current regulator for applying hysteresis to the current, comprising control electronics connected to the current regulator, said control electronics regulating the hysteresis proportionally to the current value through the winding.

* * * * *